US008362756B2

(12) United States Patent
Weinstein et al.

(10) Patent No.: US 8,362,756 B2
(45) Date of Patent: Jan. 29, 2013

(54) DIGITAL BOOST FEEDBACK VOLTAGE CONTROLLER FOR SWITCH-MODE POWER SUPPLIES USING PULSE-FREQUENCY MODULATION

(75) Inventors: Jason Weinstein, Toronto (CA); Zhenyu Zhao, Burlington (CA); Jingquan Chen, San Jose, CA (US)

(73) Assignee: Exar Corporation, Fremont, CA (US)

( * ) Notice: Subject to any disclaimer, the term of this patent is extended or adjusted under 35 U.S.C. 154(b) by 231 days.

(21) Appl. No.: 12/974,903

(22) Filed: Dec. 21, 2010

(65) Prior Publication Data

US 2012/0153916 A1  Jun. 21, 2012

(51) Int. Cl.
*G05F 1/40* (2006.01)
*G05F 1/575* (2006.01)
(52) U.S. Cl. ........ 323/288; 323/225; 323/267; 323/271; 363/60
(58) Field of Classification Search .................. 323/223, 323/225, 267, 271, 282, 283, 284, 288, 350; 363/59, 60
See application file for complete search history.

(56) References Cited

U.S. PATENT DOCUMENTS

| | | | | |
|---|---|---|---|---|
| 5,532,577 A * | 7/1996 | Doluca | ......................... | 323/282 |
| 6,756,772 B2 * | 6/2004 | McGinnis | ..................... | 323/225 |
| 6,900,620 B2 * | 5/2005 | Nishimori et al. | ........... | 323/267 |
| 6,919,713 B2 * | 7/2005 | Hoshino et al. | ............... | 323/267 |
| 7,298,116 B2 * | 11/2007 | Sluijs | ............................ | 323/222 |
| 7,733,070 B2 * | 6/2010 | Kumagai | ...................... | 323/267 |
| 8,058,861 B2 * | 11/2011 | Pelrine et al. | ................. | 323/288 |

* cited by examiner

*Primary Examiner* — Gary L Laxton
(74) *Attorney, Agent, or Firm* — Fliesler Meyer LLP

(57) ABSTRACT

A controller produces high-side and low-side control signals. The high and low-side signals are used to switch high-side and low-side transistors in the power stage to control the voltage across the power stage output capacitor of the power stage. A boost feedback charge pump receives the low or high-side signal to increase the charge on a charge pump output capacitor. The controller is configured to send Pulse Frequency Modulation (PFM) high and low-side signals that control the voltage on the power stage output capacitor and charge the charge pump output capacitor. The controller is also configured to send boost feedback (BFB) high and low-side signals that charge the boost feedback capacitor, but are designed to not significantly change the charge on the power stage output capacitor.

20 Claims, 3 Drawing Sheets

DIGITAL BOOST FEEDBACK VOLTAGE CONTROLLER FOR SWITCH-MODE POWER SUPPLIES USING PULSE-FREQUENCY MODULATION

BACKGROUND

DC-to-DC converters are used in a variety of applications to produce a regulated DC output from an unregulated DC input. Typically, a battery is used as the DC input of the DC-to-DC converter. The battery can decline in voltage over time as the battery discharges or gets older and there can be variations in the DC voltage output of different batteries.

The DC-to-DC converter can ensure that a regulated DC output is produced. One type of DC-to-DC converter is a buck converter that produces a lower DC voltage output than the DC voltage input. A controller can produce high-side and low-side control signals that selectively switch the DC input voltage into an inductor-capacitor (LC) circuit. The high-side and low-side control signals can be sent in different modes such as a Pulse Frequency Modulation (PFM) mode where the pulse lengths are fixed but the pulse frequency varies, or a Pulse-Width Modulation (PWM) mode where the pulse width varies but the pulse frequency remains the same.

An additional power rail can be produced using a charge pump circuit. The circuit can be powered by the input voltage source, another output voltage rail, or any other source. The charge pump is switched using one of the driver signals from the main switch-mode power supply channel. The charge pump establishes an output voltage that is a certain multiple of the input voltage, depending on the number of stages used in the charge pump less the voltage drops introduced by the diode forward-bias voltages as well as any parasitic resistances.

The charge pump feature is useful when a step-up voltage is required (as opposed to the step-down voltage produced by a buck converter). The additional power rail can be used for a number of purposes requiring relatively low current compared to the main output channel, such as powering a switch used to enable or disable a load.

The charge pump circuit generally runs in open-loop, where the output voltage is regulated to an approximate value. The switching signal frequency, duty ratio, and charge pump capacitance is assumed to be adequate to support the required boost feedback load. Operation in open loop is usually sufficient for controllers that operate only in Pulse-Width Modulation (PWM) mode. However, for controllers employing Pulse-Frequency Modulation (PFM) or mixed-mode control (both PWM and PFM), the switching signal frequency can become arbitrarily low, making it impossible to guarantee that the charge pump output voltage is always above the required minimum value.

SUMMARY

Embodiments of the present invention provide a solution for controllers using a PFM mode to simultaneously regulate both the main switch-mode power supply voltage as well as the output of a boost feedback charge pump circuit. When PFM mode is active, the control method allows additional switching pulses to be applied to maintain the boost feedback voltage, with minimal effect on the main switch-mode power supply voltage.

These boost feedback (BFB) pulses are designed with the high-side on-time/low-side on-time ratio being less than the PFM pulses. Theoretically, if the BFB high-side pulse is half the length of the PFM high-side pulse and the low-side pulse is kept the same, then the net charge at the output capacitor of the power stage will be unaffected by the BFB pulses. Alternately, any other BFB high side and BFB low side pulses with a high-side on-time/low-side on-time ratio of half the high-side on-time/low-side on-time ratio of the PFM pulses (such as doubling the low-side on time and keeping the high side on-time the same) will theoretically not affect the net charge at the output capacitor of the power. An offset can further be subtracted from the BFB high-side pulse (or added to the BFB low-side pulse) to ensure that the net charge at the output capacitor of the power stage will be slightly negative.

This system can be used inside digital controllers for switch mode power supplies where the gating signals or driver outputs are connected to boost feedback charge pumps and high efficiency is desired at light load conditions.

The system and method of the present invention is useful for synchronous converters, where there is both a high-side switch and a low-side switch. In non-synchronous converters, where only a diode is used instead of a low-side MOSFET, only one switching signal is used for the high-side, and the low-side conducts automatically whenever the high-side is off and there is current flowing through the inductor. In that case, BFB type pulses could not be made because there is no independent control over the low-side length.

High efficiency can be achieved in systems using BFB pulses by allowing the PFM mode to be employed that would otherwise be forced to only use the PWM mode.

A high level of programmability is available, making the invention suitable in a wide variety of applications. A modular architecture supports compatibility with multi-channel systems. There is minimal disturbance in power stage output voltage due to boost feedback charging.

DETAILED DESCRIPTION OF THE PRESENT INVENTION

Figure 1:
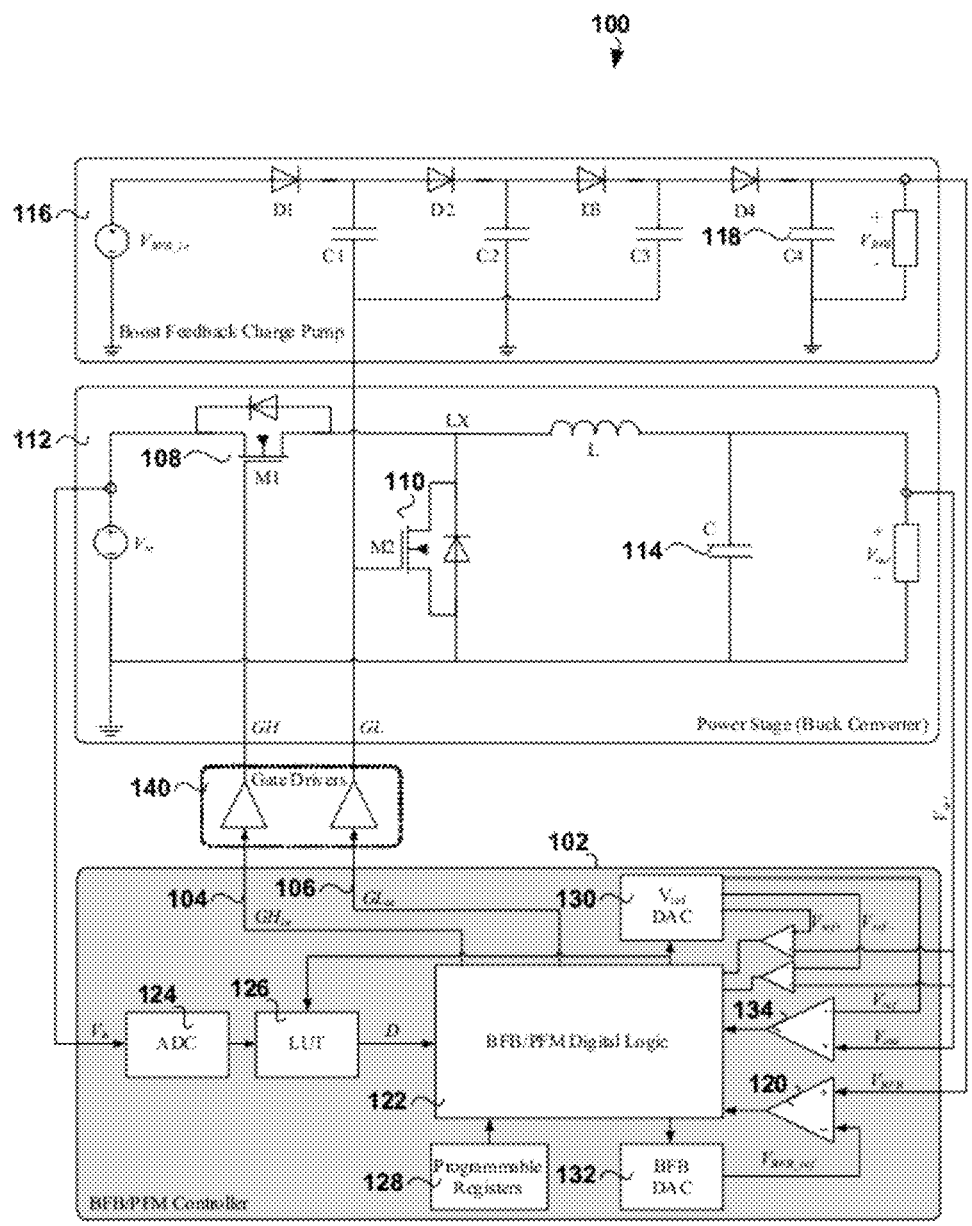
FIG. 1 is a system diagram of one embodiment of the present invention.

FIG. 1 shows a system diagram of one embodiment of the present invention.

A system 100 includes a controller 102 to produce high-side and low-side control signals. A power stage 112 includes a power stage output capacitor 114.

The high-side signals on line 104 and low-side signals on line 106 are used to switch a high-side transistor 108 and low-side transistor 110 in the power stage 112 to control the voltage across the power stage output capacitor 114.

A boost feedback charge pump includes a charge pump output capacitor 118. The boost feedback charge pump 116 receives one of the high or low-side signals to increase the charge on the charge pump output capacitor 118. In this case, the low-side signal is provided to the boost feedback charge pump 116.

The controller 102 is configured to send Pulse Frequency Modulation (PFM) high and low-side signals that controls the voltage on the power stage output capacitor and charges the charge pump output capacitor 118. The controller 102 also sends boost feedback (BFB) high and low-side signals that charge the boost feedback capacitor 118, but are designed to not significantly change the charge on the power stage output capacitor 114.

The controller 102 can sample an output voltage of the power stage 112 and an output voltage of the feedback charge pump to determine when to send the PFM signals and when to send the BFB signals. When the BFB output capacitor is low and no PFM signals are to be sent, the BFB signals can be sent. PFM signals can be prioritized over BFB signals and if the controller determines that both PFM and BFB signals would otherwise be desirable, the controller will send the PFM signals.

The controller 102 can sample an input DC voltage of the power stage to determine an on-time of the BFB high-side and low-side signals so that the net charge to the power stage output capacitor is near zero.

In one embodiment, the BFB high-side on-time/BFB low side on-time ratio is first set to be roughly half the PFM high-side on-time/PFM low side on-time ratio so that the net charge to the power stage output capacitor is not significantly affected. For example, the BFB high-side pulse can be selected to have an on-time of half of the PFM high-side pulse on-time or the BFB low-side pulse can be selected to have an on-time of twice the PFM low-side pulse on-time. An offset can be further subtracted from the BFB high-side signal (or added to the BFB low-side pulse) to ensure that there is never any positive charge applied to the power stage output by the BFB signals.

A PFM dead zone period and BFB dead zone period can be stored by the controller so that controller 102 does not produce PFM signals in the PFM dead zone period and does not produce BFB signals in the BFB dead zone period. The BFB dead zone period can be different than the PFM dead zone period. In one embodiment, the BFB dead zone period is greater than the PFM dead zone period because of the relative slowness of the boost feedback charge pump 116 to respond to the BFB and PFM signals.

A comparator 120 connected to the output of the boost feedback charge pump 116 can be used to ensure that the output voltage of the boost feedback charge pump 116 does not get too small.

The controller 102 can switch the system into another mode, such as a PWM mode, if the output voltages of the power stage 112 gets too large or too small.

The controller 102 can include BFB/PFM Digital Logic 122, an analog-to-digital converter (ADC), a steady-state duty ratio look-up table (LUT), programmable registers 128, two digital-to-analog converters (DAC's) 130 and 132 for producing boost feedback (BFB) and pulse-frequency modulation (PFM) reference signals, and two comparators 120 and 134 for monitoring the BFB and PFM voltages. The controller 102 can be, or be part of, an integrated circuit.

The controller can operate in a system consisting of gate drivers 140, a power stage 112, and a boost feedback charge pump 116. These features, or portions of these features, can be part of or separate from an integrated circuit containing all or portions of the controller 102.

The ADC 124 can be used for measuring the input voltage of the power stage 112. This measurement can be used for the calculation of the steady-state duty ratio, referred to as D.

The look-up table (LUT) 126 can be used to convert the output of the ADC 124 into steady-state duty ratio. It can be implemented as digital logic and consists of a table mapping input and output voltages to digital values corresponding to the steady-state duty ratio. The steady-state duty ratio can be calculated in order to determine the sizes of the BFB and PFM pulses that are sent to the gate drivers.

The programmable registers 128 can consist of registers for storing digital configuration values. These values can be used to promote modularity and allow the system to operate in a wide variety of conditions and applications. In one embodiment, the registers allow the following values to be programmed:

$V_{ref}$ (the power stage output voltage reference
$V_{BFB\_ref}$ (the BFB voltage reference)
PFM switching period
The dead-zone for BFB pulses
The dead-zone for PFM pulses
The offset for BFB pulses For regulating the power stage output voltage and the charge pump output voltage, two comparators 120 and 134 can be used. The references of these comparators can be set using programmable DAC's 130 and 132 allowing the regulation points to be customized.

The BFB/PFM Digital Logic module 122 can be responsible for monitoring the BFB and PFM comparator outputs to determine when pulses should be sent. Exemplary operation of this block is illustrated in the flowchart shown in FIG. 2.

Figure 2:
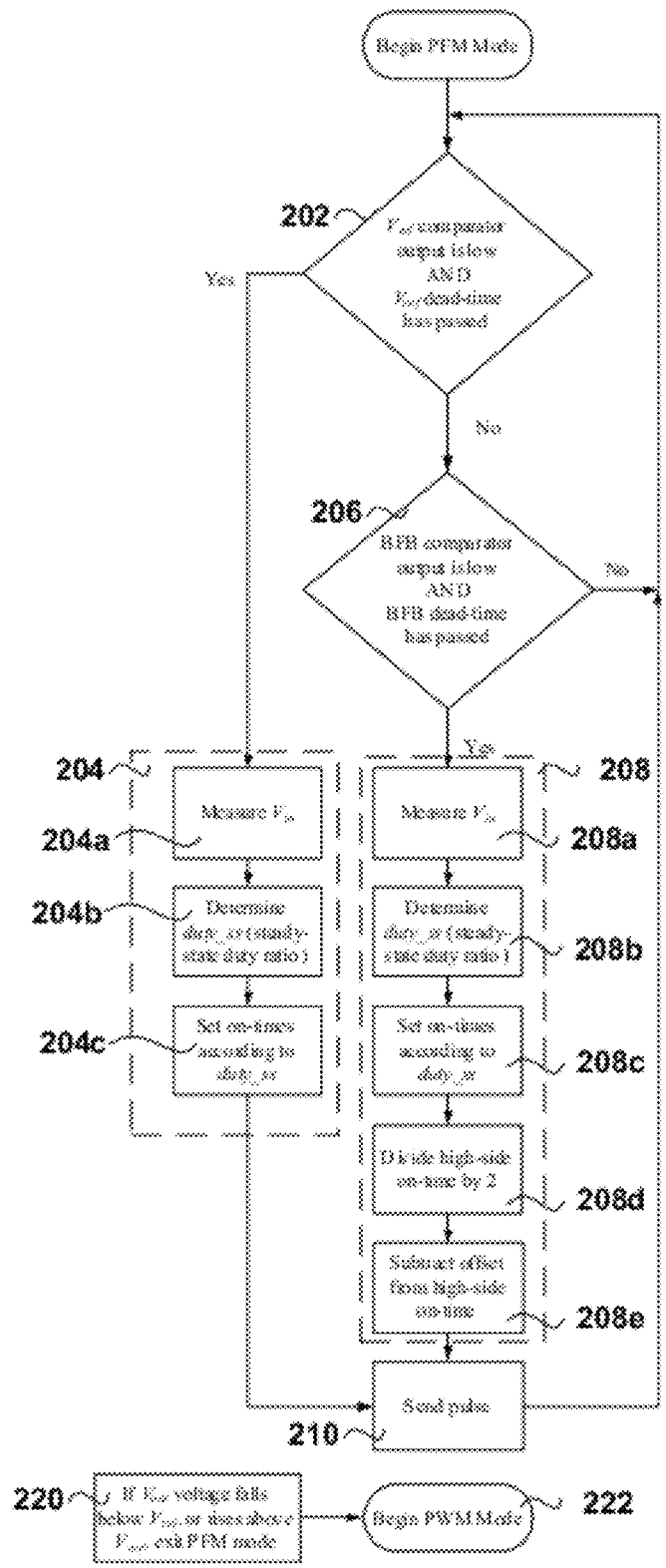
FIG. 2 is a flow chart that shows a method of one embodiment of the present invention.

Looking at FIG. 2, it is checked if the $V_{ref}$ comparator is low and $V_{ref}$ dead time has passed in step 202. If so, the PFM signals are determined in step 204. If not, in step 206, it is determined if the BFB comparator is low and the BFB dead time has passed. If so, in step 208, the BFB signals are determined. If not, the process returns to step 202. After the PFM signals are determined in step 204 or after the BFB signals are determined in step 208, in step 210, the determined signals are sent and the process returns to step 202.

An exemplary step 204, for the determination of the PFM signals can include measuring $V_{in}$ of the power stage in step 204a, determining the steady state duty ratio in step 204b and setting the on-time of the high and low-signals based on the steady state ratio in step 204c.

An exemplary step 208 for the determination of the BFB signals can calculate what would be the PFM high side and low side on-times in steps 208a, 208b and 208c that track the features of steps 204a, 204b and 204c. After these steps, the high-side output on-time can be cut in half in step 208d. (alternately, the low side on time could be doubled or both the low side and high side on-times can be changed so that the high side on-time/low side on-time ratio is halved) An offset can be subtracted from the high-side on-time (or added to the BFB low-side on-time) in step 208e after step 208d.

In step 220, if the $V_{out}$ voltage falls below $V_{ref}^-$ or rises above $V_{ref}^+$, then in step 222, another mode, such as the PWM mode, can be entered.

Figure 3:
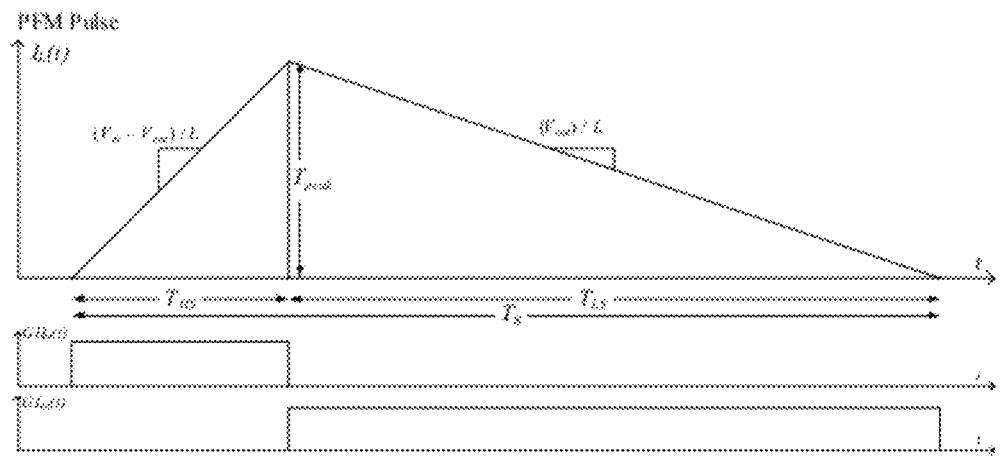
FIG. 3 shows a Pulse-Frequency Modulation (PFM) timing diagram and resulting inductor current.

A timing diagram for PFM pulses is shown in FIG. 3. When the power stage output voltage falls below $V_{ref}$, D (corresponding to the steady-state duty ratio outputted from the LUT) can be used to calculate the on-time of the high-side pulse $T_{HS}$. $T_{HS}$ is set such that the ratio between $T_{HS}$ and $T_S$ (where $T_S$ is the total of the on-times of the high-side and low-side pulses) is equal to the steady-state duty ratio, D:

$$\frac{T_{HS}}{T_S} = D = \frac{V_{out}}{V_{in}} \tag{1}$$

$$T_{HS} = DT_s \tag{2}$$

$T_{HS}$ is calculated to be proportional to D so that the low-side switching signal, GL, goes low approximately when the inductor current $I_L$, is equal to zero. This ensures that for synchronous power stage topologies, high efficiency is achieved by avoiding diode conduction in the low-side switch. When $V_{in}$ changes, a different duty ratio will be produced by the LUT to ensure that the low-side switch turns off approximately when the inductor current reaches zero.

The BFB/PFM Digital Logic can also consist of a digital pulse-width modulator (DPWM). The DPWM receives the digital values calculated for the on-times of the high-side and low-side pulses, and produces pulses of the appropriate widths that are sent to the gate drivers.

After each PFM pulse is sent, the logic will wait until the dead-zone has lapsed. The dead-zone is a period of time that can be set using a programmable register. The main purpose of the dead-zone is to ensure that the inductor current is always zero at the start of each PFM pulse, in case of any non-idealities in the calculation of pulse width in the previous cycle. Another purpose of the PFM dead-zone is to avoid sending pulses too frequently and to ensure that discontinuous conduction occurs. When a PFM pulse is sent, switching noise can cause the PFM comparator to trigger prematurely. By waiting until the dead-zone has lapsed, the controller avoids sending pulses due to switching noise.

Figure 4:
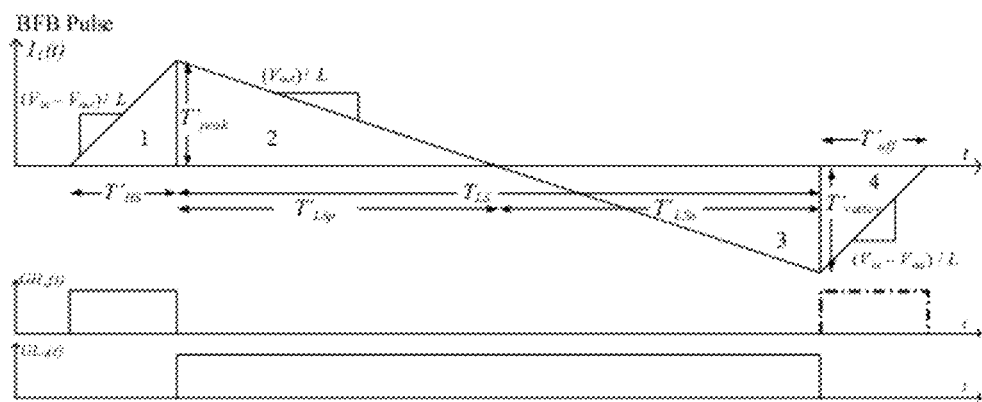
FIG. 4 shows a boost feedback (BFB) timing diagram and resulting inductor current.

When the BFB feature is enabled, the module can also monitor the output of the BFB comparator. When the PFM switching frequency is high enough such that the $V_{BFB}$ is maintained at a value greater than $V_{BFB\_reg}$, no additional action is necessary. However, when the PFM switching frequency is very low (due to a low power stage load) additional pulses can be injected in order to sustain the charge pump output voltage. When the charge pump voltage, $V_{BFB}$, falls below $V_{BFB\_ref}$, the controller can send a BFB pulse in order to toggle the charge pump, increasing $V_{BFB}$. The BFB pulse can have a similar structure as a PFM pulse: a high-side switching pulse is sent, followed by a low-side switching pulse. However, the on-time of the high-side pulse can be decreased to half of what it would be for a PFM pulse, as illustrated in FIG. 4. Optionally, an additional high-side pulse can be sent following the low-side pulse to improve efficiency so that the inductor current flows through the high-side switch instead of the high-side diode. When the high-side on-time is set to half of $T_{HS}$, the net charge delivered to the output capacitor of the power stage is zero. The proof for this is shown below. It is assumed that the effects of dead-time, diode forward-bias voltages, equivalent series resistances, and other parasitic elements are negligible.

Assume $T'_{HS}$ is set to half of $T_{HS}$:

$$T'_{HS} = \frac{1}{2}T_{HS} = \frac{1}{2}DT_S = \frac{V_{out}}{2V_{in}}T_S \quad (3)$$

In PFM mode, pulses are discontinuous and, as a result, the current is zero at the start of each pulse (either a PFM pulse or a BFB pulse). When the high-side switch is on, the slope of the inductor current is:

$$S_{HS} = \frac{V_{in} - V_{out}}{L} \quad (4)$$

where L is the inductance and $V_{in}$ and $V_{out}$ are the input and steady-state output voltages, respectively. When the low-side switch is on, the slope of the inductor current is:

$$S_{LS} = -\frac{V_{out}}{L} \quad (5)$$

The peak voltage reached is found to be:

$$T'_{peak} = T'_{HS}S_{HS} = \frac{V_{out}}{2V_{in}}\frac{V_{in} - V_{out}}{L}T_S \quad (6)$$

The area of triangle 1 is therefore equal to:

$$A_1 = \frac{1}{2}[T'_{HS}][T'_{peak}] \quad (7)$$

$$A_1 = \frac{1}{2}\left[\frac{V_{out}}{2V_{in}}T_S\right]\left[\frac{V_{out}}{2V_{in}}\frac{V_{in} - V_{out}}{L}T_S\right] \quad (8)$$

$$A_1 = \frac{V_{out}^2(V_{in} - V_{out})T_S^2}{8V_{in}^2 L}$$

The area of triangle 2 is equal to:

$$A_2 = \frac{1}{2}[T'_{LSp}][T'_{peak}] \quad (9)$$

$$A_2 = \frac{1}{2}\left[\frac{T'_{peak}}{-S_{LS}}\right]\left[\frac{V_{out}}{2V_{in}}\frac{V_{in} - V_{out}}{L}T_S\right]$$

$$A_2 = \frac{1}{2}\left[\frac{\frac{V_{out}}{2V_{in}}\frac{V_{in} - V_{out}}{L}T_S}{\frac{V_{out}}{L}}\right]\left[\frac{V_{out}}{2V_{in}}\frac{V_{in} - V_{out}}{L}T_S\right]$$

$$A_2 = \frac{1}{8}\left[\frac{V_{in} - V_{out}}{V_{in}}T_S\right]\left[\frac{V_{out}}{V_{in}}\frac{V_{in} - V_{out}}{L}T_S\right]$$

$$A_2 = \frac{V_{out}(V_{in} - V_{out})^2 T_S^2}{8V_{in}^2 L} \quad (10)$$

We can find the time when the low-side switch is on and the current is negative ($T'_{LSn}$) as follows:

$$T'_{HS} + T'_{LS} = T'_s$$

$$T'_{HS} + T'_{LSp} + T'_{LSn} = T_s - T'_{HS}$$

$$T'_{LSn} = T_s - 2T'_{Hs} - T'_{LSp} \quad (11)$$

$$T'_{LSn} = T_S - \frac{V_{out}}{V_{in}}T_S - \frac{V_{in} - V_{out}}{2V_{in}}T_S \quad (12)$$

$$T'_{LSn} = \left[\frac{2V_{in} - 2V_{out} - V_{in} + V_{out}}{2V_{in}}\right]T_S$$

$$T'_{LSn} = \left[\frac{V_{in} - V_{out}}{2V_{in}}\right]T_S = T'_{LSp}$$

The valley voltage is found to be:

$$T'_{valley} = T'_{LSn}S_{LS} = -\frac{V_{out}}{2V_{in}}\frac{V_{in} - V_{out}}{L}T_S = T'_{peak} \quad (13)$$

The area of triangle 3 is therefore found to be:

$$A_3 = \frac{1}{2}[T'_{LSn}][T'\text{valley}] \quad (14)$$

$$A_3 = \frac{1}{2}\left[\frac{T_S(V_{in} - V_{out})}{2V_{in}}\right]\left[-\frac{V_{out}}{2V_{in}}\frac{(V_{in} - V_{out})}{L}T_S\right]$$

$$A_3 = -\frac{1}{8}\left[\frac{V_{in} - V_{out}}{V_{in}}T_S\right]\left[\frac{V_{out}}{V_{in}}\frac{(V_{in} - V_{out})}{L}T_S\right]$$

$$A_3 = -\frac{V_{out}(V_{in} - V_{out})^2 T_S^2}{8V_{in}^2 L} = -A_2 \quad (15)$$

$T'_{off}$, the time from when the low-side switch turns off until the inductor current reaches zero, can be found to be:

$$T'_{off} = \frac{-T'_{valley}}{S_{HS}} \quad (16)$$

$$T'_{off} = \frac{\frac{V_{out}}{2V_{in}}\frac{V_{in} - V_{out}}{L}T_S}{\frac{V_{in} - V_{out}}{L}}$$

$$T'_{off} = \frac{V_{out}}{2V_{in}}T_S \quad (17)$$

Then the area of triangle 4 is found to be:

$$A_4 = \frac{1}{2}[T'_{off}][T'_{valley}] \quad (18)$$

$$A_4 = \frac{1}{2}\left[\frac{V_{out}}{2V_{in}}T_S\right]\left[-\frac{V_{out}}{2V_{in}}\frac{V_{in} - V_{out}}{L}T_S\right]$$

$$A_4 = -\frac{V_{out}^2(V_{in} - V_{out})T_S^2}{8V_{in}^2 L} = -A_1 \quad (19)$$

The total charge delivered as a result of the BFB pulse is therefore found to be:

$$C_{total} = A_1 + A_2 + A_3 + A_4 \quad (20)$$

$$C_{total} = 0 \quad (21)$$

Therefore, a pulse with a high-side on-time that is half of the nominal value will result in zero net current delivered to the output capacitor.

As such, from (3) the steady-state duty ratio, D, is used to calculate the high-side and low-side on times for the BFB pulse as follows:

$$T'_{HS} = \frac{1}{2}DT_S = \frac{V_{out}}{2V_{in}}T_S$$

$$T'_{LS} = (1 - D)T_S = \frac{V_{in} - V_{out}}{V_{in}}T_S$$

The high-side on-time is thus half of what it would be for a PFM pulse and the low-side on-time remains the same. The division by two can be implemented in a very simple fashion in digital logic as a bit shift operation. As with the PFM pulses, $V_{in}$ is measured and the LUT output is used to compensate for any changes in V.

After the BFB pulse has been sent, $V_{BFB}$ increases while $V_{out}$ remains constant (except for any discharge due to the power stage load) since zero net charge is delivered to the power stage output capacitor. Before sending another BFB pulse, the controller will wait for the BFB dead-zone to lapse. It exists to prevent a series of BFB pulses from being unnecessarily sent due to switching noise and the delay of the BFB charge pump. The BFB dead-zone should not necessarily be equal to the PFM dead-zone since it should be set depending on the characteristics of the BFB charge pump circuit, and thus is not correlated to the power stage. The BFB dead-zone can be calculated and programmed based the charge pump circuit parameters such as the capacitor sizes and diode specifications.

It is possible that both the conditions for generating BFB pulses (the BFB dead-zone lapses and the BFB comparator triggers) and PFM pulses (the PFM dead-zone lapses and the PFM comparator triggers) occur at the same time. In such a case, the PFM pulse takes priority over the BFB pulse. The PFM pulse will simultaneously increase $V_{out}$ and $V_{BFB}$, after which sending a BFB pulse is no longer necessary. If a BFB pulse were to be sent in this scenario, $V_{BFB}$ would increase but $V_{out}$ would remain below $V_{ref}$, causing a sag in the power stage output voltage.

Although the BFB pulses are timed so that there will be no affect on $V_{out}$, in a practical implementation of the system, the pulse can cause $V_{out}$ to either increase or decrease. This can be due to quantization errors in measuring $V_{in}$, quantization errors in the sizes of the output pulses from the DPWM, and non-idealities in the power stage such as parasitics, and voltage drops across the diodes and switches. If a series of BFB pulses results in a significant decrease in $V_{out}$, the PFM comparator will trigger and a PFM pulse will be sent. Thus, a BFB pulse that causes a decrease in $V_{out}$ will not be harmful as $V_{out}$ is regulated to be above $V_{ref}$ when PFM mode is employed. However, if the BFB load is relatively high and the PFM load is relatively low, BFB pulses will be sent frequently and PFM pulses will be sent infrequently. In this case, if quantization errors and non-idealities cause each BFB pulse to increase $V_{out}$, the power stage output voltage can increase without bounds. To prevent this from occurring, an offset is subtracted from $T'_{HS}$ (or added to the $T'_{LS}$) before the BFB pulse is generated. This offset, which is programmable, reduces the probability that a BFB pulse will cause $V_{out}$ to increase.

The design also includes a safety mechanism that can be used with controllers that employ both PWM and PFM modes, as shown in FIG. 1. Two additional comparators are used to monitor $V_{out}$. One of the comparators has a reference, $V_{ref+}$, that is larger than $V_{ref}$ and the other has a reference, $V_{ref-}$, that is smaller than $V_{ref}$. If $V_{out}$ falls or rises outside of the range bounded by the two references, the controller will exit PFM mode and enter PWM mode. This feature is included as a precautionary measure in case the BFB pulse generation causes $V_{out}$ to rise or fall to a significant degree.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A system comprising:
   a controller to produce high-side and low-side control signals;

a power stage including a power stage output capacitor, the high and low-side signals being used to switch high-side and low-side transistors in the power stage to control the voltage across the power stage output capacitor of the power stage; and a boost feedback charge pump including a charge pump output capacitor, the boost feedback charge pump receiving the low-side or high-side signal to increase the charge on the charge pump output capacitor;

wherein the controller is configured to send Pulse Frequency Modulation (PFM) high and low-side signals that controls the voltage on the power stage output capacitor and charges the charge pump output capacitor and configured to send Boost Feedback (BFB) high and low-side signals that charge the boost feedback capacitor, but are designed to not significantly change the charge on the power stage output capacitor.

2. The system of claim 1, wherein the controller samples an output voltage of the power stage and an output voltage of the feedback charge pump to determine when to send the PFM signals and when to send the BFB signals.

3. The system of claim 1, wherein the controller samples an input voltage of the power stage to determine an on-time of the BFB high-side and low-side signals so that the net charge to the power stage output capacitor is near zero.

4. The system of claim 3, wherein an offset is subtracted from the BFB high-side signal or added to the BFB low-side signal to ensure that there is never any positive charge applied to the power stage output by the BFB signals.

5. The system of claim 1, wherein a PFM dead zone period and BFB dead zone period are stored by the controller and the controller does not produce PFM signals in the PFM dead zone period and does not produce BFB signals in the BFB dead zone period.

6. The system of claim 5, wherein the BFB dead zone period is different from than the PFM dead zone period.

7. The system of claim 1, further comprising:
a comparator connected to the output of the boost feedback charge pump that is used to ensure that the output voltage of the boost feedback charge pump does not get too small.

8. The system of claim 7, wherein the controller switches the system into another mode if the output voltage of the power stage gets too large or too small.

9. The system of claim 1, wherein PFM signals are prioritized over BFB signals and if the controller determines that both PFM and BFB signals would otherwise be desirable, the controller sends the PFM signals.

10. The system of claim 1, wherein the BFB high-side on-time/BFB low side on-time ratio is first set to be roughly half the PFM high-side on-time/PFM low side on-time ratio and thereafter an offset period is subtracted from the BFB high-side on-time or added to the BFB low-side on-time.

11. A controller for a Pulse Frequency Modulation (PFM) power supply with a boost feedback charge pump with an output capacitor and a power storage with output capacitor, the controller configured to produce PFM high-side and low-side signals and Boost Feedback (BFB) high-side and low-side signals, the PFM signals being used to control the charge on the output capacitor of a power stage and to charge the output capacitor of the boost feedback charge pump, the BFB signals being adapted to charge the output capacitor of the boost feedback charge pump, but to not significantly affect the charge on the power stage output capacitor.

12. The controller of claim 11, wherein the controller samples an output voltage of the power stage and an output voltage of the boost feedback charge pump to determine when to send the PFM signals and when to send the BFB signals.

13. The controller of claim 11, wherein the controller samples an input voltage of the power stage to determine an on-time of the BFB high-side and low-side signals so that the net charge to the power stage output capacitor is near zero.

14. The controller of claim 13, wherein an offset is subtracted from the BFB high-side signal or added to the BFB low-side pulse signal to ensure that there is never any positive charge applied to the power stage output signal by the BFB signals.

15. The controller of claim 11, wherein a PFM dead zone period and BFB dead zone period are stored by the controller and the controller does not produce PFM signals in the PFM dead zone period and does not produce BFB signals in the BFB dead zone period.

16. The controller of claim 15, wherein the BFB dead zone period is different than the PFM dead zone period.

17. The controller of claim 11, further comprising:
a comparator connected to the output of the boost feedback charge pump that is used to ensure that the output voltage of the boost feedback charge pump does not get too small.

18. The controller of claim 17, wherein the controller switches the system into another mode if the output voltage of the power stage gets too large or too small.

19. The controller of claim 11, wherein PFM signals are prioritized over BFB signals and if the controller determines that both PFM and BFB signals would otherwise be desirable, the controller sends the PFM signals.

20. The controller of claim 11, wherein the BFB high-side on-time/BFB low side on-time ratio is set to be roughly half the PFM high-side on-time/PFM low side on-time ratio and thereafter an offset period is subtracted from the BFB high-side on-time or added to the BFB low-side on-time.

* * * * *